Jan. 13, 1970        A. M. REGAN        3,489,215
CIRCULATING CASING HANGER AND RUNNING TOOL APPARATUS
Original Filed Oct. 9, 1967        2 Sheets-Sheet 1
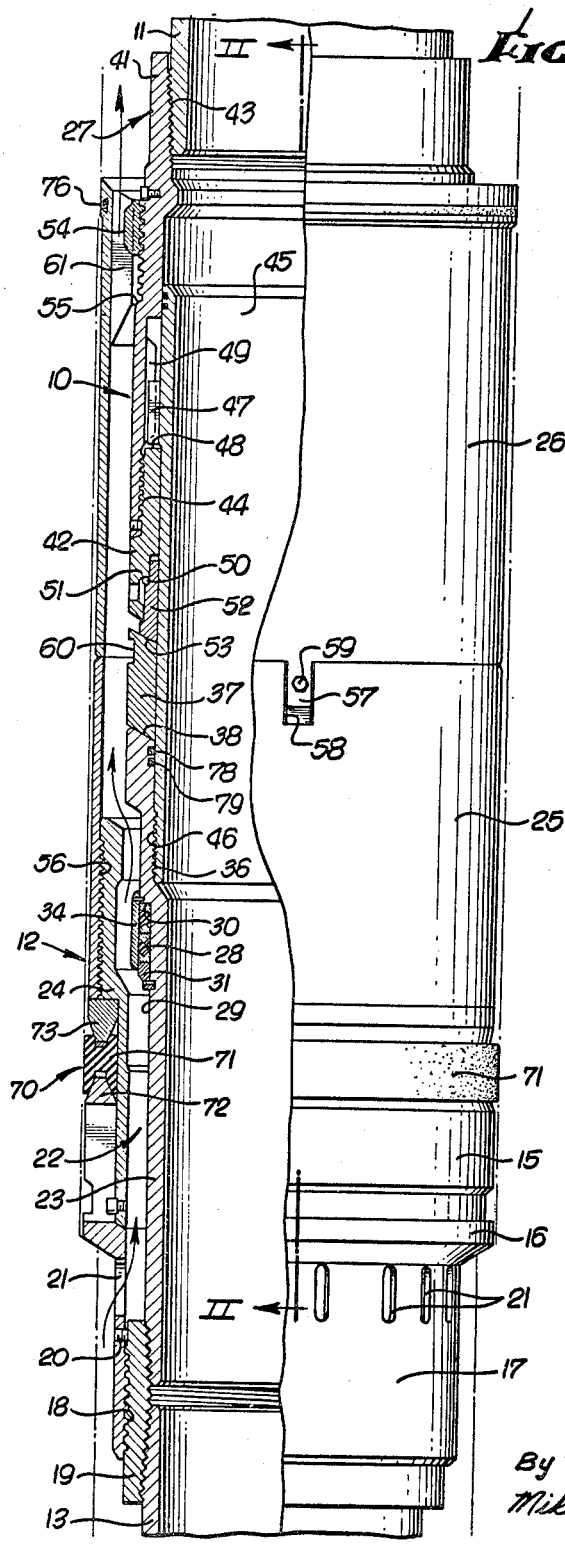
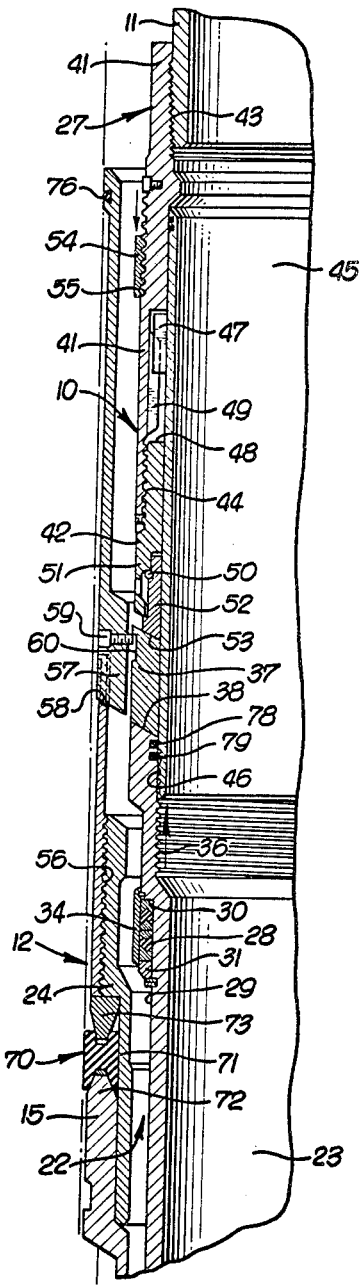
INVENTOR
A. MICHAEL REGAN
By Miketta, Glenny, Poms & Smith
ATTORNEYS.

Jan. 13, 1970
A. M. REGAN
3,489,215
CIRCULATING CASING HANGER AND RUNNING TOOL APPARATUS
Original Filed Oct. 9, 1967
2 Sheets-Sheet 2
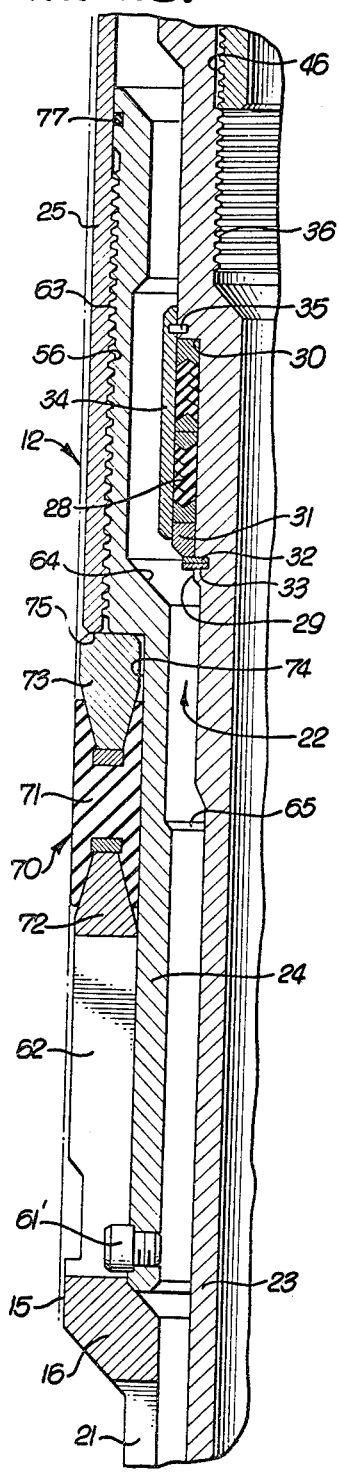
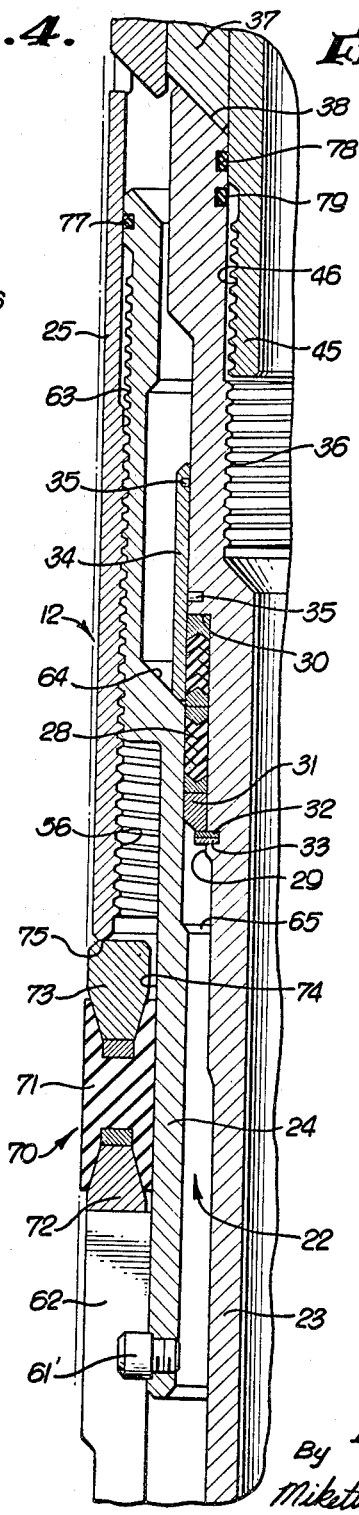
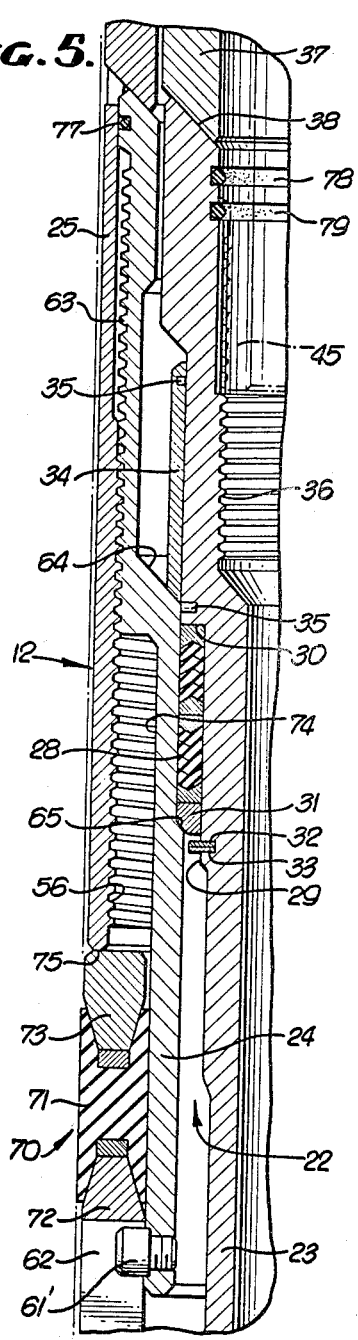
INVENTOR
By A. Michael Regan
Miketta, Glenny, Poms & Smith
ATTORNEYS.

United States Patent Office 3,489,215
Patented Jan. 13, 1970

3,489,215
CIRCULATING CASING HANGER AND RUNNING TOOL APPARATUS
A. Michael Regan, Huntington Beach, Calif., assignor to Regan Forge & Engineering Company, San Pedro, Calif., a corporation of California
Original application Oct. 9, 1967, Ser. No. 673,624. Divided and this application Nov. 26, 1968, Ser. No. 778,962
Int. Cl. E21b 33/03
U.S. Cl. 166—87                              4 Claims

ABSTRACT OF THE DISCLOSURE

A casing hanger assembly including a casing hanger body with support means for landing said body on a shoulder within a well hole casing head; an internal cement return passage in said body; at least one port means in said hanger body below said support means for communicating cement returns from below said casing head shoulder into said internal cement return passage; said internal cement return passage including an upwardly opening end in said hanger body above said support means for communicating cement returns from said cement return passage into a casing bore above said hanger body; packer means positioned in said internal cement return passage for closing said cement return passage; packer engaging means mounted within said hanger body; a second packer means for sealing the hanger body-casing head annulus about said casing hanger body; and means for applying a setting force on said second packer means concurrently with said applying of a setting force on said first named packer means.

RELATED APPLICATION

This application is a division of copending application Ser. No. 673,624 filed Oct. 9, 1967.

BACKGROUND OF THE INVENTION

In order to cement the well hole casing in the well, it is normally suspended by a casing hanger body seated on a ledge normally provided in the well head casing. Cement is then pumped down the inner bore of the running string through the casing hanger body and well hole casing with fluid returns, including cement particles and other abrasive materials, flowing upwardly in the annulus about the well hole casing. Prior casing hanger bodies have provided flow through passages in the landing surface for landing the hanger body at the well head. These cement returns have then in some instances been directed upwardly about the exterior of the casing body past external seal means provided. Such construction has had the disadvantage that the cement returns flow past the exposed external seal or packer means and the packer means must be capable of sealing the rather wide cement return passage required to allow return of comentitious and other abrasive, aggregate and other materials flowing upwardly in the cement return passage.

In other prior circulating casing hangers, the cement returns have been passed through ports in the hanger body above the flow through passages of the landing or supporting means for the body with an externally mounted seal or packer means adapted to be forced downwardly over the exterior surfaces of the cement return ports. Such downward moving seal means was also employed for sealing the large cement return annulus or passage provided between the hanger body and well head casing above the flow through passages of the landing or support means for the hanger body. Such prior construction has had the disadvantage of requiring the seal means to span a rather large passage and, in particular, has had the disadvantage of requiring the seal means to move downwardly over the cement return passage ports provided in the exterior surfaces of the hanger body. This is because of the possibility of cement particles or other aggregate material lying in the cement ports and preventing the closure of the seal means thereby. Further, since the casing-well head casing annulus is normally filled with fluid, a fluid block may prevent lowering of the seal means downwardly over the return ports. In some instances, the cement build up about the well hole casing may also prevent lowering of the seal means over the cement return ports. In any of these situations, the proper operation of the seal means is prevented and further operations must be conducted before the circulating casing hanger can be completely sealed to close the well hole casing-well head casing annulus.

It is the principal object of the present invention to disclose and provide a circulating casing hanger and running tool apparatus allowing for the cementing of a well hole casing in the well wherein there is provided means for easily sealing the cement return passage.

It is another object to provide external packer or sealing means positioned within an internal cement return passage located in the casing hanger body, external packer means on said casing hanger body, both of said means for concurrently applying setting forces on the external and internal packer means.

These and additional objects and advantages of the circulating casing hanger and running tool apparatus of the present invention will become apparent to those skilled in the art from a consideration of the within detailed explanation of a preferred exemplary embodiment thereof.

SUMMARY OF THE INVENTION

The circulating casing hanger assembly of the present invention generally includes a casing hanger body having a landing surface for landing of the assembly upon an internal ledge provided in the well head casing, an internal cement return passage in the body communicating the annulus below the hanger body with an annulus above the hanger body within the well head casing, an internal seal means provided in the cement return passage in the body and means associated with the hanger body and movable upwardly in the cement return passage for engaging the generally stationary seal means and thereby closing the cement return passage to the flow of cement returns therethrough. The packer means is preferably positioned at a side wall of the internal cement return passage and a packer engaging means or sleeve mounted for vertical movement relative to the hanger body is adapted to be moved upwardly into an overlying, sealing engagement with the packer means through rotation of the running tool apparatus associated therewith. A protective sleeve is normally provided overlying the packer means to protect the packer means from the cement returns flowing through the internal cement return passage. Means are provided for yieldably mounting the protective sleeve at the packer so that an upward movement of the packer engaging means for closing the cement return passage causes movement of the protective sleeve away from the packer means.

A second or external packer means is provided for sealing the small hanger body-casing head annulus about the casing hanger body. This latter annulus is not employed for cement returns. Means are provided for applying a setting force on each of the packer means employed, the sealing or setting forces are applied concurrently. The running tool apparatus associated with the casing head assembly includes a running tool body having means at its upper end for attaching the apparatus to a running string and rotation therewith. Means are provided for releasably connecting the running tool body to the casing hanger body to allow running of the casing hanger body to the well, such means being releasable through initial rotation of the running string and running tool body relative to the hanger body after landing at the well. A bearing means is provided at a lower end of the running tool body to facilitate such relative rotation of the running tool body relative to the casing hanger body. A bore protector sleeve, where required, may be employed as part of a drive sleeve assembly operated by rotation of the running tool body and employed for driving the packer engaging means upwardly relative to the hanger body and cement return passage into its passage closing position. The connection between the running tool body and the drive sleeve, and bore protector sleeve where required, is adapted to remain inoperable to cause rotation of the drive sleeve until an initial amount of rotation of the drilling string and running tool has been effected in order to allow release of the running tool from the casing hanger body by such initial rotation of the running tool body relative to the hanger body. An internal connector sleeve associated with the running tool may be backed out of a threaded connection with the hanger body during such initial rotation of the running tool so that after cementing operations have been completed the running tool may be released and the seal means provided in the hanger body actuated to seal the casing hanger in the well head casing. Testing operations may then be completed and the running string removed with the well hole casing and its associated casing hanger securely cemented and sealed in the well, respectively.

A more complete understanding of the invention will be afforded to those skilled in the art from a consideration of the following detailed explanation of a preferred exemplary embodiment of the circulating casing hanger and running tool apparatus according to the present invention. Reference will be made to the appended sheets of drawings in which:

FIG. 1 is an elevational view, partially in section, of the preferred exemplary embodiment of circulating casing hanger and running tool apparatus according to the present invention;

FIG. 2 is a vertical sectional view of the apparatus of FIG. 1 taken therein along the plane II—II;

FIG. 3 is an enlarged detail view of a portion of the apparatus of FIG. 1 showing the internal cement return passage open to the flow of cement returns therethrough;

FIG. 4 is a detail view as in FIG. 3 showing the exemplary packer engaging means moved upwardly in the internal cement return passage and moving the packer protective sleeve upwardly away from the exemplary packing means; and FIG. 5 is a detail view as in FIGS. 3 and 4 showing the packer engaging means fully raised in its packer engaging and passage closing position with a shoulder on the engaging means applying a setting force on the packing means and an external sleeve applying a setting force on an annulus seal exteriorly of the packer engaging means.

A detailed explanation of a preferred exemplary embodiment of the circulating casing hanger and running tool apparatus, according to the present invention, will now be made. Referring first to FIG. 1, a running tool assembly, indicated generally at 10, is shown suspended from a running string 11 and supporting a casing hanger assembly, indicated generally at 12. The casing hanger assembly is adapted to hang a well hole casing 13 within a conventional well during otherwise conventional cementing operations for cementing the well hole casing into the well. A well head casing with an internal ledge for receiving the casing hanger assembly is represented in broken line in FIGS. 1 through 5.

The casing hanger assembly, indicated generally at 12, includes a casing hanger body 15 having a landing surface, shoulder or support means 16 for landing the body 15 on the complementary internal shoulder normally found within a conventional well head casing. A lower or tail portion 17 of the casing hanger body 15 is provided with internal threads 18 for hanging the well hole casing 13 via a spacing collar 19, having appropriately provided internal and external threads for being secured into the tail portion 17 and mounting the well hole casing 13, as seen in FIG. 1. Set screws, as screw 20 may be employed for securing spacer sleeve 19 within tail portion 17.

An internal cement return passage is provided within the hanger body 15 for the return of cement returns, flowing up about the well hole casing 13, through the hanger body and to the annulus within the well head casing above the hanger body. As seen in FIG. 1, the casing hanger body 15 is provided with a plurality of ports 21 in the hanger body outer side wall below the shoulder or support means 16 communicating with an internal cement return passage indicated generally at 22. Internal cement return passage 22 is preferably a half-inch annular passage formed within the hanger body 15. In the preferred exemplary embodiment, the inner side wall of the cement return passage is provided by the inner hanger body portion or sleeve 23 mounted at its lower end to the spacer or collar 19 secured to the hanger body tail portion 17. The outer wall of passage 22 is provided in part by the hanger body 15 and the sleeve 24 mounted thereon, as seen in FIG. 1. The upper end of cement return passage 22 formed between the sleeve members 23 and 24 opens through a drive sleeve 25 and bore protector sleeve 26 to the annulus, indicated generally at 27, within the well head casing above the hanger body.

Means are provided for closing the internal cement return passage to the flow of cement returns therethrough after cementing of the well hole casing 13 has been completed. Such means, in the exemplary embodiment, includes the provision of a packer means 28 positioned in the internal cement return passage, indicated generally at 22, on an internal side wall 29 of the passage, side wall 29 of passage 22 being provided by the external surface of internal sleeve 23. Packer means 28 is preferably mounted along one side of the passage with an upper end thereof seated against a shoulder 30, as best seen in FIG. 3. A packing end ring 31 at the lower end of the packer means 28 is provided and the packing means is held up against shoulder 30 by the retainer or split rings 32 and 33.

A protective sleeve 34 is provided normally overlying the packer means 28 for protecting it from the cement returns passing thereby during cementing operations. The protective sleeve 34 is yieldably mounted in its position overlying the annular packer means 28 by means of shear pins, as pin 35. As more fully explained hereinafter, and as seen in FIGS. 4 and 5, upward movement of the packer engaging means or sleeve 24 within the casing hanger body causes the removal of sleeve 34 from the packer means, as seen in FIG. 4, and a closure of the cement return passage, as seen in FIG. 5. Such upward movement of the packer engaging sleeve 24 is accomplished through rotation of drive sleeve 25 by the running tool as hereinafter explained.

Referring again to FIG. 1, the running tool assembly, indicated generally at 10 includes a running tool body comprising an upper tool body portion 41 and a lower tool body portion 42. Running tool body portion 41 is provided with internal threads 43 for connecting the tool body to the running string 11. The lower tool body portion 42 is secured by threads 44 to a lower end of the portion 41.

Means are provided for releasably connecting the running tool body to the casing hanger body to allow running of the hanger body by the running tool into the well and for subsequent release thereof after cementing of the well hole casing into the well. As seen in FIG. 1, the exemplary connecting means includes an internal connecting sleeve 45 having external threads 46 on its lower end which connect into the internal threads 36 provided on the upper inner end of hanger inner body portion or sleeve 23. Connecting sleeve 45, in turn, is suspended upon the lower running tool body portion 42, during running into the well, by the engagement of tongue or wing portions, as tongue 47 which seat on the upper end 48 of the running tool lower body portion 42. The tongue or wing portions 47 are received in grooves formed by splines 49 provided on the internal surface of the upper running tool body 41 to provide a splined connection between internal sleeve 45 and the running tool body. Rotation of running tool 41 by the running string 11 relative to the stationary casing hanger assembly, as subsequently explained, causes a backing out or withdrawal of the connecting sleeve 45 from the casing hanger assembly inner body portion or sleeve 23.

Means are provided at the lower end of the running tool assembly, indicated generally at 10, for rotatably seating the running tool assembly upon the casing hanger assembly, indicated generally at 12. As seen in FIG. 1, the preferred exemplary means for seating the running tool body upon the casing hanger body includes the provision of a plurality of roller bearings 50 positioned between an upper bearing or outer race portion 51 formed integrally in portion 42 and a lower or inner bearing or race portion 52. The lower and inner race portion 52 is adapted by a lower beveled or inclined surface 53 to seat on a mating surface provided by the spacer or bearing ring 37 seated upon the mating beveled surface 38 provided on the upper end of the casing hanger body inner portion 23. Spacer ring 37 and inner race or bearing member 52 are held in assembled relation between the running tool body lower portion 42 and the casing hanger inner body portion 23 due to the connection afforded between the two by the internal connecting sleeve 45 during running of the tool to the well head.

On landing of the circulating casing hanger and running tool apparatus at the well head with the hanger body shoulder or landing means 16 landed on a mating and supporting internal ledge or shoulder in the well head casing, the weight of the running tool and running string is rested upon the casing hanger through the bearing means provided by roller bearings 50 and the associated bearing race members 51 and 52. Initial rotation of the running string 11 causes relative rotation between the running tool body and the stationary casing hanger body. Such relative rotation causes the connecting sleeve 45 to rotate with the running tool body because of the splined connection between splines 49 and tongues 47 which causes the connecting sleeve 45 to back out of and release from the threads 36 provided at the upper inner end of casing hanger inner body portion 23, as seen in FIG. 2. During such initial rotation of the running tool by the running string 11 in order to release the running tool from the casing hanger assembly, a winged nut 54 moves downwardly about the running tool upper body portion 41 toward a shoulder 55 thereon, as seen in FIG. 1. Nut 54 functions as part of the means for actuating or driving the packer engagement or sleeve 24 upwardly to close the internal cement return passage 22 by rotation of the running string 11, as now hereinafter explained.

Means are provided in association with the running tool body and the packer engaging means or sleeve 24 for moving the packer engaging means upwardly relative to the casing hanger body to close off the cement return passage in response to rotation of the running tool body by the running string 11 after release of the connecting sleeve 45. As seen in FIGS. 1 and 2, a drive sleeve 25 is mounted by threads 56 externally of the packer engaging means and internal passage forming sleeve 24. Drive sleeve 25 and bore protector sleeve 26 are keyed together for joint rotation by the tongue or key portions 57 depending from sleeve 26 into the upwardly opening slots 58 in sleeve 25. Upward movement of sleeves 25 and 26, however, is prevented by the provision of pin means, as pin 59, on sleeve 26 which engage in a circumferential groove or slot 60 provided in spacer ring 37. Drive sleeve 25 and bore protector sleeve 26 are rotated by the engagement between wing nut 54 and the splines 61 provided on the upper inner surface of sleeve 26 after nut 54 has moved downwardly against shoulder 55. Initial rotation of upper body portion 41 of the running tool by the running string 11 causes relative rotation between nut 54 and body 41, the nut 54 being held stationary by splines 61 and moving downwardly, as seen in FIG. 2, toward shoulder 55. When wing nut 54 abuts shoulder 55, the internal connecting sleeve 45 having been released by then from the casing hanger body portion 23, the rotation of the running tool begins to drive the bore protector sleeve 26 and its associated drive sleeve 25 through the interference of wing nut 54 with the splines 61.

From the foregoing, it can be seen that after cementing of the well hole casing 13 in the well, the running string 11 may be rotated, preferably to the right, with the weight of the running string and running tool seated upon the bearing means provided by the inner and outer race members 52 and 51 with the roller bearings 50 therebetween. The weight of the running string and tool upon the casing hanger body, which is seated upon the internal shoulder or ledge provided in the well head casing, prevents the casing hanger body 15 from rotating within the well. The rotation of drive sleeve 25, after nut 54 has bottomed on shoulder 55, by rotation of the drill string with the casing hanger body 15 being held stationary within the well head casing, causes a vertically upward movement of the packing engaging means or packer sealing sleeve 24.

Packer engaging means or sealing sleeve 24, as best seen in FIGS. 3 through 5, is slidably received within the casing hanger body 15 and is keyed thereto for nonrotative, vertical relative movement by key or pin 61' received within the vertical slot 62 in body 15. Since the packer sealing sleeve 24 is prevented by key or pin 61' from rotating relative to the hanger body 15, rotation of drive sleeve 25 causes sleeve 24 to move vertically upwardly relative to the hanger body on its threaded connection 63 with the drive sleeve 25. Sealing sleeve 24 is provided with an abutment shoulder 64, as seen in FIGS. 3 and 4, which is adapted to engage and move the seal protecting sleeve 34 away from the seal or packer 28 on upward movement toward the sealed position of FIG. 5. Shear pin 35, mounting the protective sleeve 34 in place overlying the packer 28, is sheared as the shoulder 64 of the sleeve 24 abuts and moves the sleeve upwardly within the casing hanger assembly. Continued rotation of the running string 11, transmitted through the running tool body, winged nut 54, bore protector sleeve 26 and drive sleeve 25 to the sealing or packer engaging sleeve 24 causes a second shoulder 65 on the packer engaging sleeve 24 to engage packing end ring 31 and apply a setting or seal actuating force upon the seal or packer means 28, as seen in FIG. 5. Internal passage 22 is thereby effectively closed against further cement returns therethrough by the upward movement of the packer engaging sleeve and the upwardly directed setting force on packer 28 effected thereby.

A second packer means is provided for sealing the hanger body-casing head annulus about the casing hanger body. Such external seal for the casing hanger body is not required to fill a large annular space since cement returns are not to be passed thereby. In the exemplary embodiment, such external or second packer means are indicated generally at 70 and include the provision of an annular packer element 71 mounted upon a stationary end ring 72, preferably formed integrally with the hanger body 15. An upper movable packer end ring 73 is also provided, the packer element 71 and upper end ring 73 fitting within a recess provided in the hanger body assembly, the recess 74 in sleeve 24 in the exemplary embodiment. After the hanger assembly has been seated in the well head casing and the cementing of the well hole casing has been completed, rotation of drive sleeve 25, as hereinbefore explained, causes an upward movement of the packer engaging sleeve 24 into the position of FIG. 5. When the packer engaging sleeve shoulder 65 abuts and applies a setting force upon the packer 28, further upward movement of sleeve 24 is progressively resisted as the setting force is applied and packer 28 expands within the confines of the inner hanger body portion 33 and sleeve 24. As packing engaging sleeve 24 resists further upward movement, the rotative forces applied to drive sleeve 25 by the running string 11 causes drive sleeve 25 to move downwardly relatively to the packing engaging sleeve 24 and casing hanger body 15, pin 59 in bore protector sleeve 26 moving downwardly in slot 60 provided in the ring 37 as seen in FIG. 2. Such downward movement of the drive sleeve 25 applies a seal or packer setting force upon seal or packer element 71, the bottom end 75 of drive sleeve 25 bottoming upon the movable upper packing end ring 73. The setting forces applies to the packers 28 and 71 may thus be concurrently applied by the relative vertical movement between the two sleeves 24 and 25 to completely close and seal the casing hanger-casing head annulus and casing hanger internal cement return passage.

Additional O-ring seals or packer elements are provided for sealing between the various moving parts of the casing hanger and running tool apparatus. As seen in FIGS. 1 and 2, an external O-ring seal 76 is provided about the upper external end of the bore protector sleeve 26 to seal the bore between the bore protector and surrounding well head casing. As seen in FIG. 3, an external packer ring 77 is provided about the upper end of packer engaging sleeve 24, sealing the threaded connection 63 between sleeves 24 and 25 from the cement returns passing upwardly through passage 22. Internal packer ring or sealing means 78 and 79, as seen in FIGS. 4 and 5, are provided for sealing between the internal connection sleeve 45 and the upper end of casing hanger internal body portion 33 into which sleeve 45 is threadably engageable. Seal 78 and 79 are adapted to prevent the introduction of cement returns into the threaded connection 36 between members 45 and 33.

After the completion of the cementing operation and the closure of the internal cement return passage 22 by moving the packer engaging sleeve upwardly against packer means 28 and the drive sleeve 25 down against the external packer means including packer 71, the seals thus effected may be tested by closing a blowout preventer provided on the running string and pressuring through conventional choke and kill lines to determine whether the seals are properly set. Such testing can be accomplished even though the running tool is disengaged from the casing hanger assembly since the O-ring seal or packer element 78 provided in the hanger body inner body portion 33 is still in sealing engagement with the internal connecting sleeve 45. After such testing, the running string may be raised, withdrawing running tool body portions 41, 42 and the associated bearing means, leaving the casing hanger assembly, bore protector sleeve 26 and the ring 37 ready to receive successively run tools upon its inwardly inclined upper landing surface.

From the foregoing detailed explanation of a preferred exemplary embodiment of the circulating casing hanger and running tool apparatus, according to the present invention, it can be seen by those skilled in the art that the present apparatus is adapted to provide for landing of a well hole casing in a well, cementing of the same therein and sealing off of the annulus between the well hole casing and well head casing on only one trip of the apparatus into the well and at the same time install a bore protector if required. The cement returns pass upwardly through an internal annular passage of preferably approximately one-half inch width. No cement returns are taken past exposed packer or seal elements. The internal packer means provided is normally protected against contact from such cement returns and is set in a passage sealing position by an upward movement of a packer engaging means which moves upwardly away from any cement particles which may be found in the cement return passage. Such upward movement of the closing sleeve prevents a fluid block of the passage and in particular allows the displacement of any cement or debris in the annular passage.

The external packer or seal means provided is not required to fill a large annular space since cement returns are not passed upwardly about the casing hanger assembly. The internal and external seals can be tested after the application of setting forces without removing the running tool therefrom. The apparatus of the present invention can further be employed with conventional cement plugs run from the surface or with shear-off type plugs. The hanger can also be provided with hold down slips if required. Also, the same running tool may be used for all casing sizes in a particular size well head.

Having thus disclosed and explained a preferred exemplary embodiment of the circulating casing hanger and running tool apparatus of the present invention, it should be understood by those skilled in the art that various adaptations, modifications and alterations of this exemplary apparatus may be made which may come within the scope of the present invention which is defined and limited only by the following claims:

I claim:

1. In a circulating casing hanger assembly for hanging a well hole casing in a well from a shoulder in a casing head for providing for cement returns past said shoulder during cementing of said well hole casing within the well and for effecting a closure of said cement returns after said cementing, said assembly including a casing hanger body having support means for landing said body on a shoulder within a casing head at the well and hanger means for hanging a well hole casing from said body; an internal cement return passage provided within said hanger body; at least one port means in said hanger body below said support means for communicating cement returns from below said casing head shoulder into said internal cement return passage; said internal cement return passage including an upwardly open end in said hanger body above said support means for communicating cement returns from said internal cement return passage of said hanger body into the casing bore above said hanger body; the improvement comprising:

internal packer means positioned in said internal cement return passage;

internal packer engaging means mounted within said hanger body and operable within said hanger body into a passage closing position of engagement with said internal packer means;

external packer means for sealing the hanger body-casing head annulus about said casing hanger body; and means for applying a setting force on said internal packer means concurrently with applying of a setting force on said external packer means.

2. In a circulating casing hanger assembly of claim 1, the improvement wherein:

said packer engaging means includes a sleeve-like member mounted for vertical movement within said hanger body and said internal cement passage with an outer surface thereof engaging said external packer means an inner surface thereof engaging said internal packer means when raised into said position of engagement with said internal packer means.

3. In a circulating casing hanger assembly including a casing hanger body having a landing surface for landing of said assembly upon an internal ledge provided in a well head casing and an internal cement return passage in said body communicating the annulus between said hanger body and well head casing below said landing surface with an annulus above said assembly, the improvement comprising:

an internal seal means in said return passage in said body;

an external seal means for sealing the hanger body-casing head annulus about said casing hanger body; and means for applying a setting force on said internal seal means concurrently with applying a setting force on said external seal means.

4. A circulating casing hanger assembly of claim 3 wherein:

said internal seal means includes an internal packer means positioned in said internal cement return passage and a packer engaging means mounted within said hanger body and operable within said hanger body into a passage closing position of engagement with said internal packer means;

external packer means is provided for sealing the hanger body-casing head annulus about said casing hanger body; and means are provided for applying a setting force on said internal packer means concurrently with applying of a setting force on said external packer means.

References Cited

UNITED STATES PATENTS

| | | | |
|---|---|---|---|
| 3,273,646 | 9/1966 | Walker | 166—88 X |
| 3,279,539 | 10/1966 | Brown et al. | 166—88 X |
| 3,324,951 | 6/1967 | Balmer et al. | 166—89 X |
| 3,335,799 | 8/1967 | Miller | 166—87 X |
| 3,360,048 | 12/1967 | Watkins | 166—87 |
| 3,382,921 | 5/1968 | Todd | 166—88 |

DAVID H. BROWN, Primary Examiner

U.S. Cl. X.R.

166—208